(12) United States Patent
Liu

(10) Patent No.: US 8,266,869 B1
(45) Date of Patent: Sep. 18, 2012

(54) MANUAL CUP SEALER

(76) Inventor: Ssu-Liu Liu, Taipei (TW)

(*) Notice: Subject to any disclaimer, the term of this patent is extended or adjusted under 35 U.S.C. 154(b) by 403 days.

(21) Appl. No.: 12/773,466

(22) Filed: May 4, 2010

(51) Int. Cl.
*B65B 51/14* (2006.01)
*B65B 7/28* (2006.01)

(52) U.S. Cl. ............................ 53/329.3; 156/583.7

(58) Field of Classification Search ............ 53/478, 53/300, 329.2, 329.3, 363–365, 367; 156/69, 156/583.7; *B65B 51/14*
See application file for complete search history.

(56) References Cited

U.S. PATENT DOCUMENTS

| | | | | |
|---|---|---|---|---|
| 888,770 A * | 5/1908 | Valerius | ............................ | 53/367 |
| 3,345,797 A * | 10/1967 | Von Stoeser | ................ | 53/329.3 |
| 3,354,605 A * | 11/1967 | Amberg et al. | ............. | 53/329.2 |
| 3,372,081 A * | 3/1968 | Hurschman | ................ | 156/583.7 |
| 3,378,991 A * | 4/1968 | Anderson | ................... | 53/329.3 |
| 4,510,014 A * | 4/1985 | Artusi et al. | .................... | 156/69 |
| 2001/0000559 A1* | 5/2001 | De Young et al. | ........... | 53/329.3 |
| 2001/0022065 A1* | 9/2001 | Torre | ............................ | 53/329.3 |
| 2006/0248860 A1* | 11/2006 | Liao | ............................ | 53/329.3 |
| 2007/0107379 A1* | 5/2007 | Dewey et al. | ................ | 53/329.3 |

* cited by examiner

*Primary Examiner* — Stephen F Gerrity
(74) *Attorney, Agent, or Firm* — Jackson IPG PLLC

(57) ABSTRACT

A manual cup sealer includes a frame unit, a sliding carrier board slidably mounted in the frame unit and carrying a lower electric heat sealing die, a transmission shaft pivotally mounted in the frame unit, a first link coupled to the transmission shaft, a first spring member connected between the first link and the sliding carrier board, a die link connected to the transmission shaft through a second link and holding an upper electric heat sealing die, and a handlebar operable by a user to rotate the transmission shaft clockwise/counter-clockwise for causing the sliding carrier board to be moved in and out of the frame unit and the upper electric heat sealing die to be lowered toward the lower electric heat sealing die to seal a sealing film to a plastic cup in the lower electric heat sealing die.

9 Claims, 8 Drawing Sheets

US 8,266,869 B1

MANUAL CUP SEALER

BACKGROUND OF THE INVENTION

1. Field of the Invention

The present invention relates to cup sealing apparatus and more particularly, to a manual cup sealer, which has a small size, and is easy to use and practical for use in an office or at home, and which allows the user to seal fine-grained coffee, fruit jelly or any other instant food in a plastic cup with a sealing film by oneself.

2. Description of the Related Art

Coffee-drinking population is continuously increasing. Many manual and automatic coffee makers are commercially available. Consumers can purchase cups 9 of fine-grained coffee 90 (see FIG. 1) in most department stores and shopping marts. When serving a cup 9 of fine-grained coffee 90, it is put in a coffee maker. When starting the coffee maker, the coffee maker will automatically pierce the top sealing film 91 and bottom wall 92 of the cup 9 and eject boil water into the cup 9 to brew the fine-grained coffee 90 for service. To serve coffee in this manner is convenient, however it still has drawbacks as follows:

1. The cups of fine-grained coffee selling in a department store or shopping mart are factory made. When a consumer gets a cup of fine-grained coffee from a department store or shopping mart and brew it, several weeks or months may have been passed after the cup of fine-grained coffee was made, and the taste of brewed coffee may be not so good.

2. People in an office and members in a family may prefer different tastes of coffee. Cups of fine-grained coffee purchased from department stores or shopping marts may be unable to satisfy different persons who have different tastes.

SUMMARY OF THE INVENTION

The present invention has been accomplished under the circumstances in view. It is therefore the main object of the present invention to provide a manual cup sealer, which allows a user to seal fine-grained coffee, fruit jelly or any other instant food in a plastic cup with a sealing film by oneself.

It is another object of the present invention to provide a manual cup sealer, which allows the user to seal the desired amount of fine-grained coffee, fruit jelly or any other instant food subject to actual requirement, keeping sealed cup coffee, cup fruit jelly or other cup instant food in good taste for service within a certain time period.

It is still another object of the present invention to provide a manual cup sealer, which saves the cost.

It is still another object of the present invention to provide a manual cup sealer, which has a small size, and is practical for use in office or at home.

It is still another object of the present invention to provide a manual cup sealer, which is easy to operate.

To achieve these and other objects of the present invention, a manual cup sealer comprises a frame unit, a sliding carrier board slidably mounted in the frame unit at the bottom side and carrying a lower electric heat sealing die, a transmission shaft pivotally mounted in the frame unit, a first link coupled to the transmission shaft, a first spring member connected between the first link and the sliding carrier board, a die link connected to the transmission shaft through a second link and holding an upper electric heat sealing die, and a handlebar operable by a user to rotate the transmission shaft clockwise/counter-clockwise. By means of rotating the transmission shaft counter-clockwise to move the first link, the sliding carrier board is moved by the first link forwardly out of the frame unit for allowing a plastic cup with a sealing film to be put together in the lower electric heat sealing die. When rotating the transmission shaft clockwise, the first link will be forced to pull the sliding carrier board backwardly toward the inside of the frame unit, and the upper electric heat sealing die will be lowered toward the lower electric heat sealing die to seal the sealing film to the plastic cup.

DETAILED DESCRIPTION OF THE INVENTION

Figure 1:
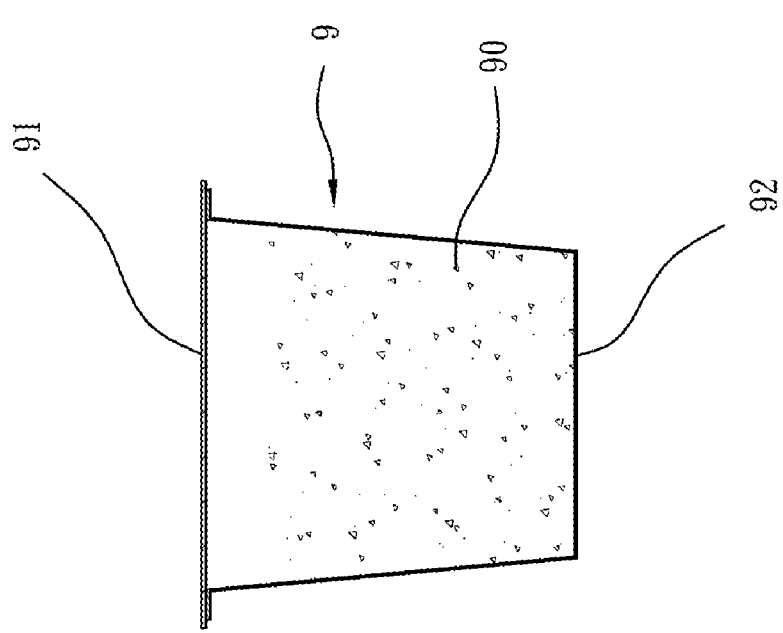
FIG. 1 is a schematic sectional view of a commercial instant coffee in cup.
Figure 2:
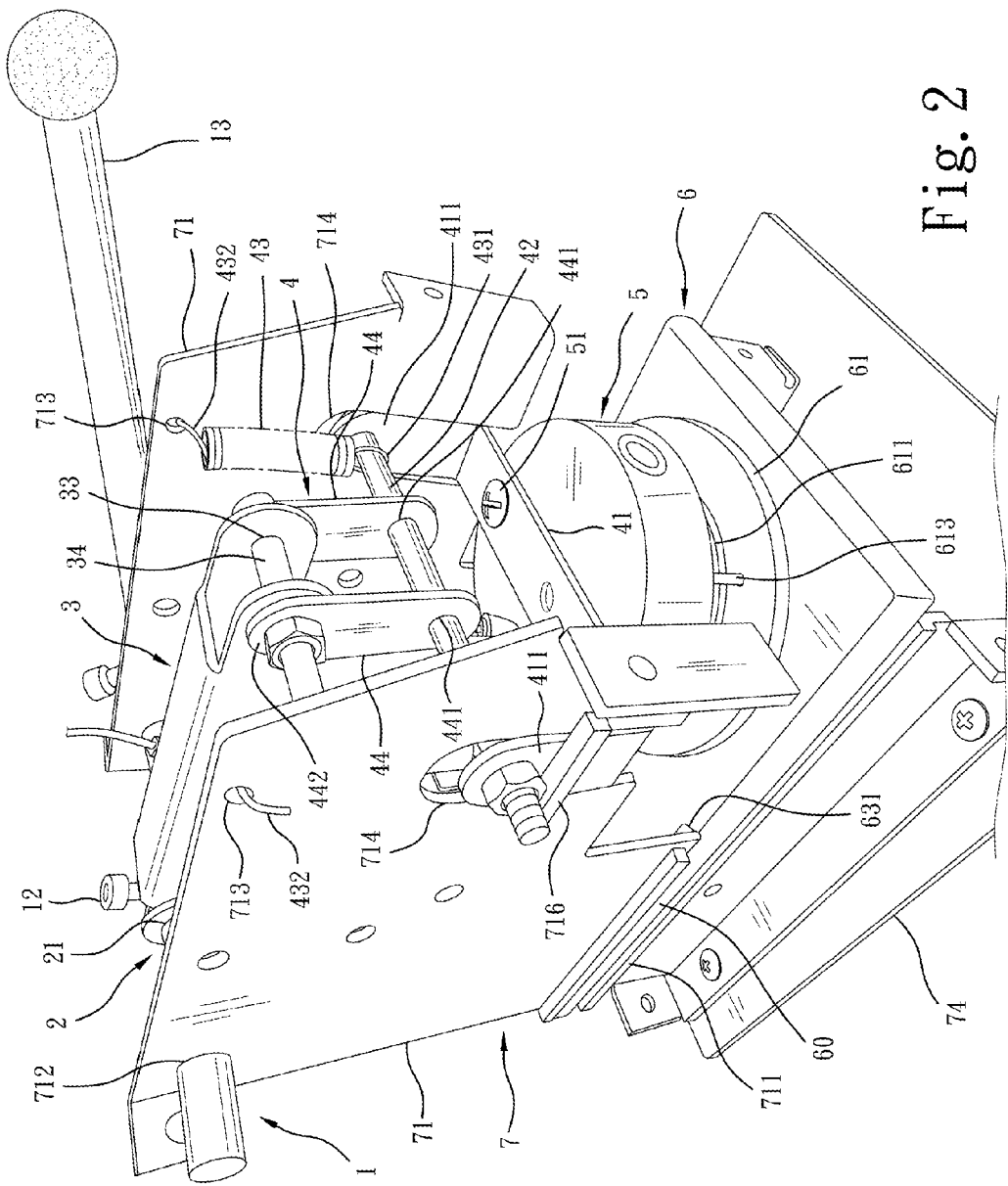
FIG. 2 is an elevational view of a hand sealer in accordance with the present invention.
Figure 3:
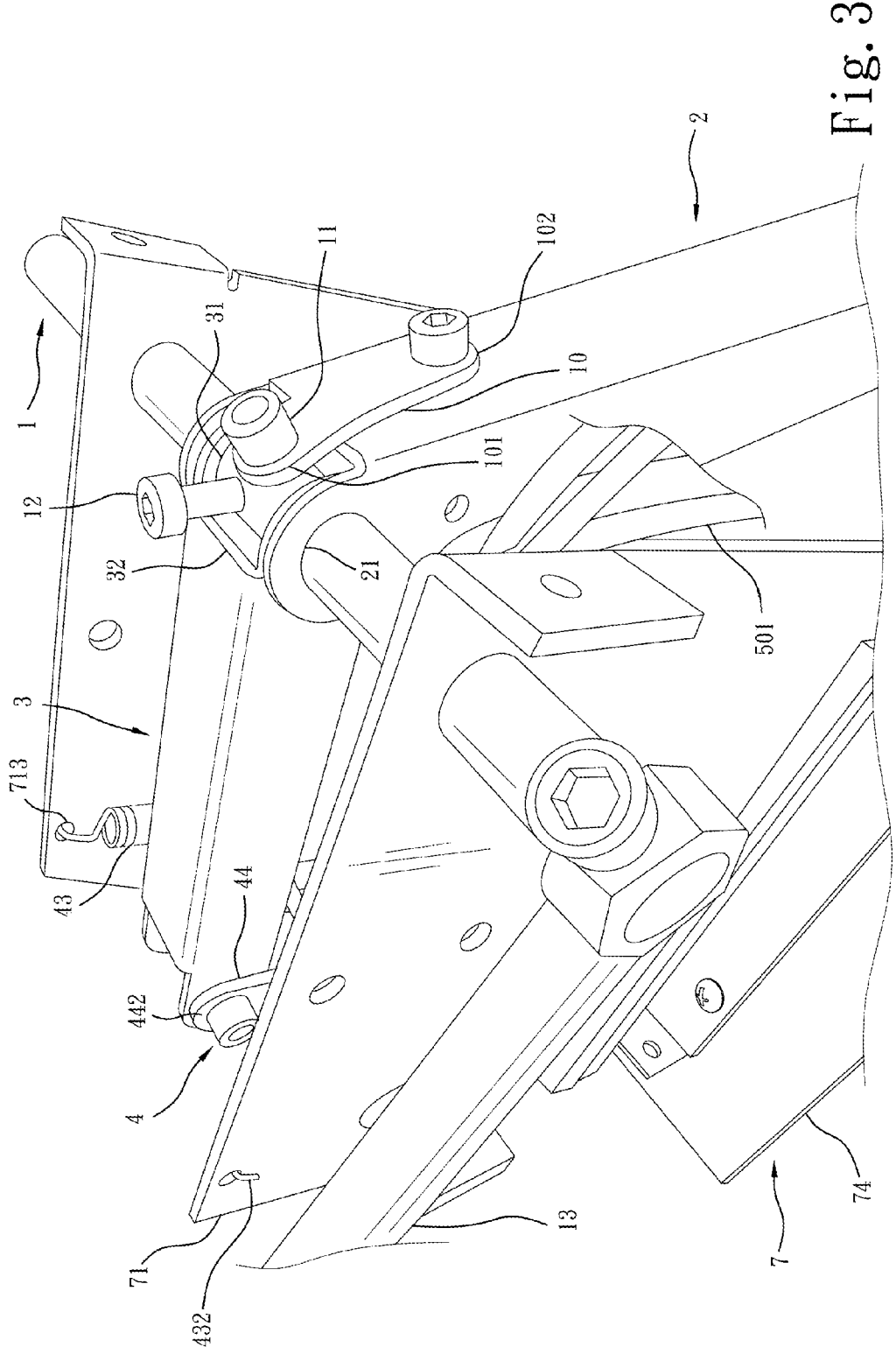
FIG. 3 is an enlarged view of a part of the hand sealer in accordance with the present invention.
Figure 4:
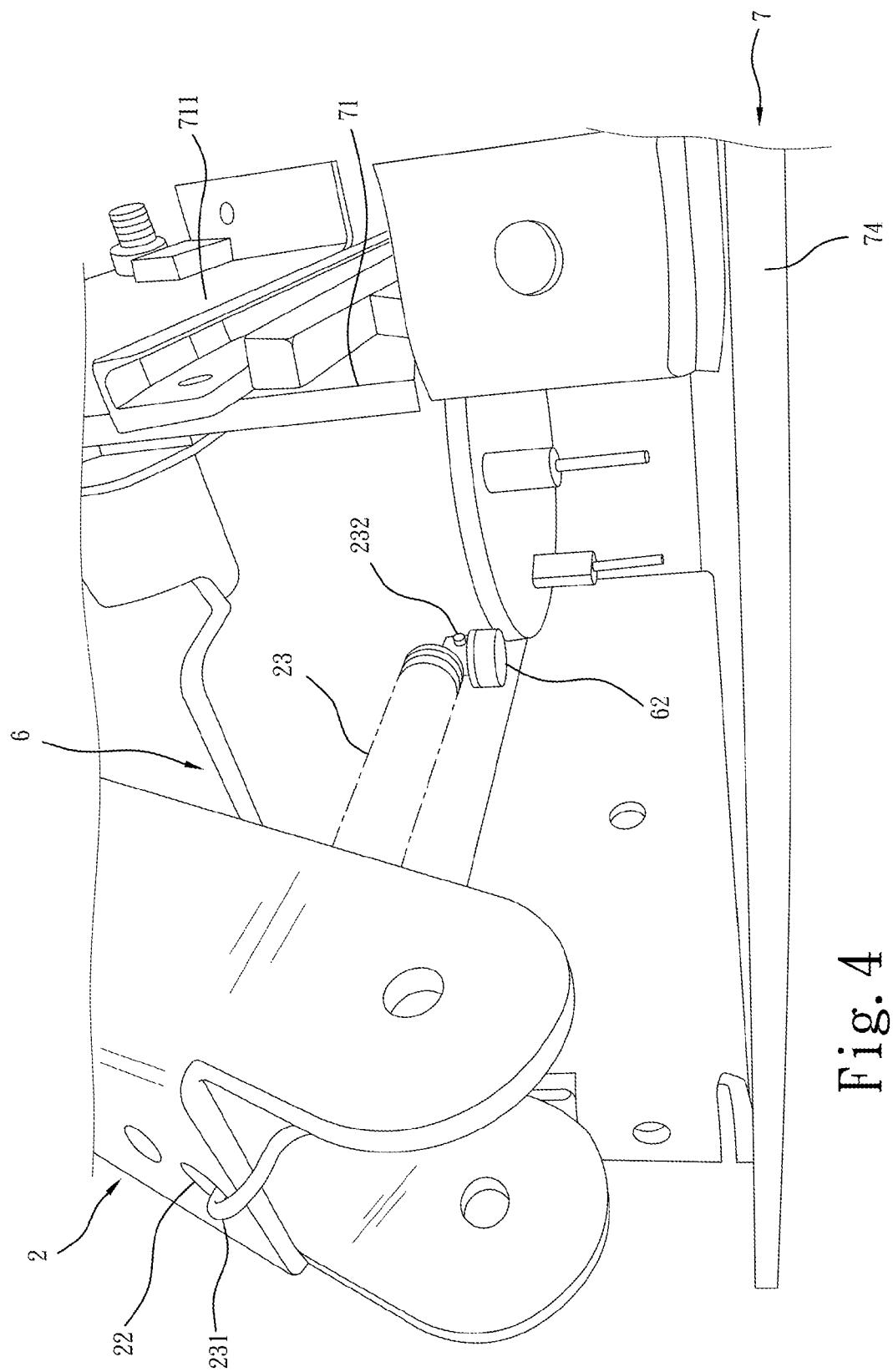
FIG. 4 is an enlarged view of another part of the hand sealer in accordance with the present invention.
Figure 5:
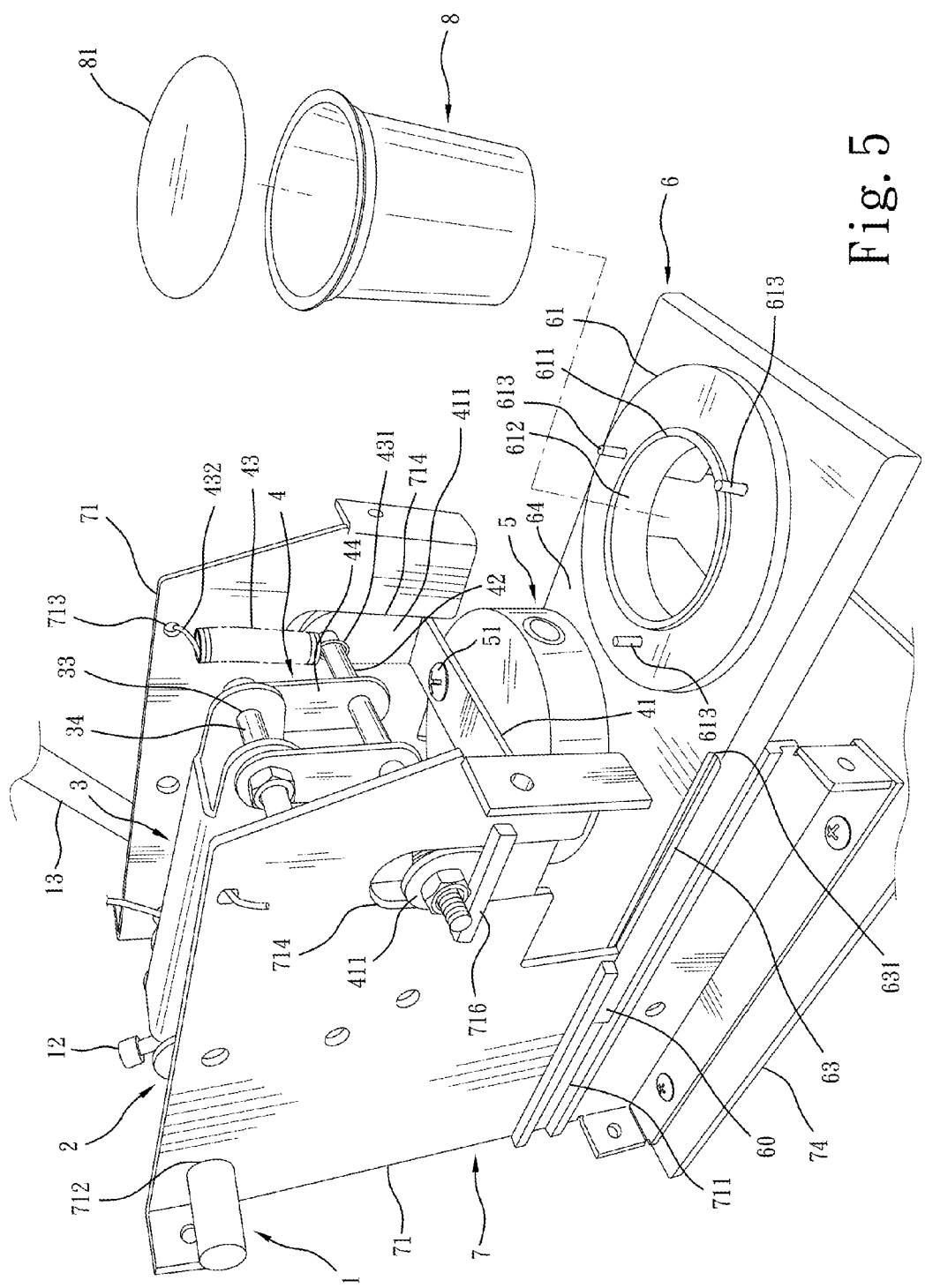
FIG. 5 is an applied view of the present invention, showing the sliding carrier board extended out before loading of a plastic cup and a sealing film.
Figure 6:
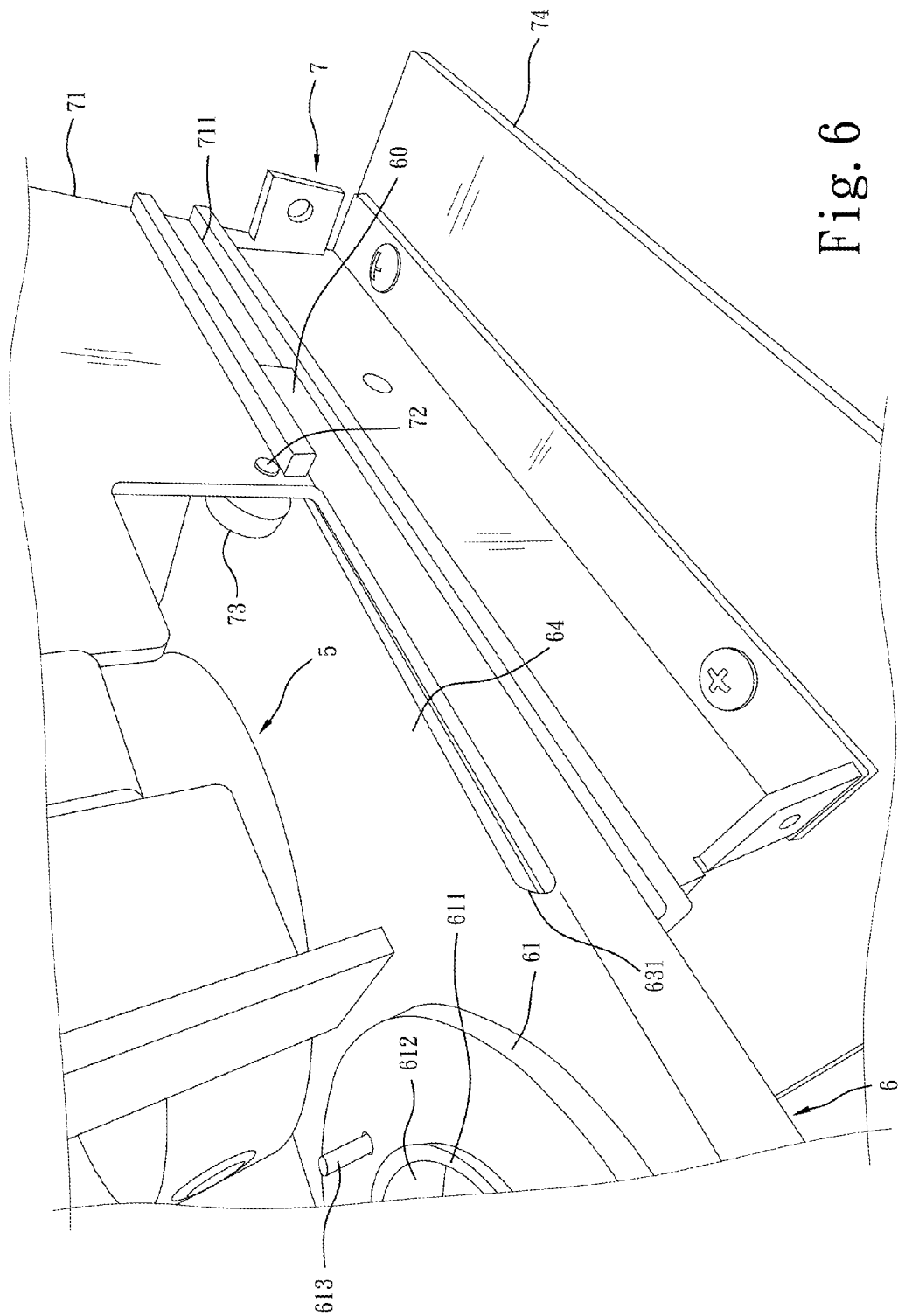
FIG. 6 is an enlarged view of still another part of the manual cup sealer in accordance with the present invention.
Figure 7:
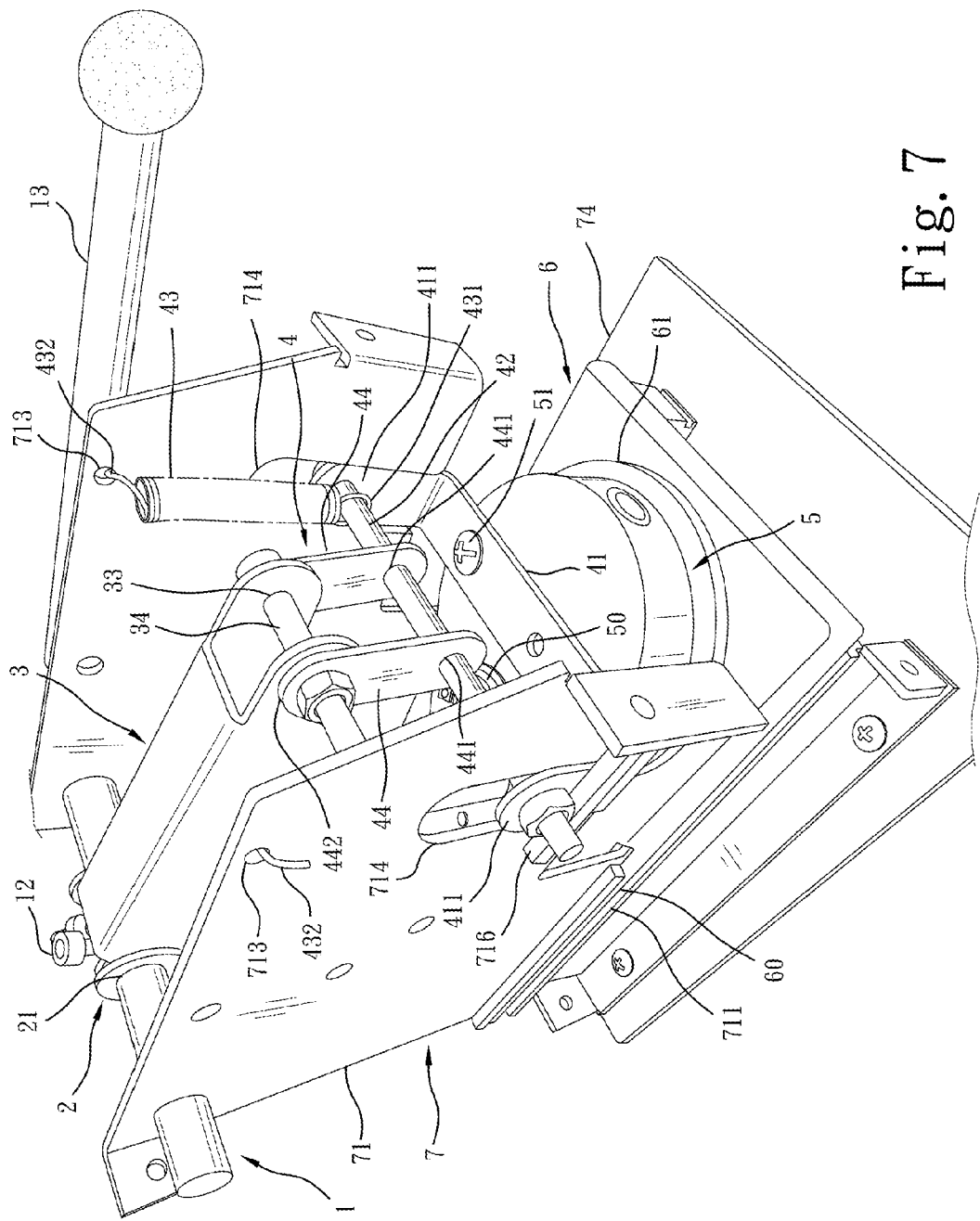
FIG. 7 corresponds to FIG. 2, showing the upper electric heat sealing die lowered and closed on the lower electric heat sealing die.
Figure 8:
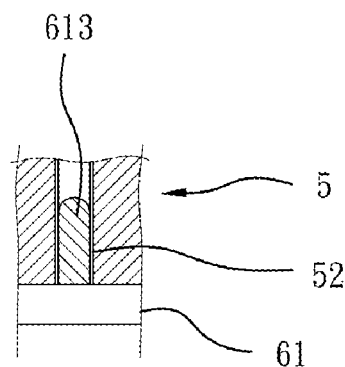
FIG. 8 is a schematic sectional view of a part of the present invention, showing the upper electric heat sealing die closed on the lower electric heat sealing die and one positioning pin of the lower electric heat sealing die inserted into one corresponding guide hole of the upper electric heat sealing die.

Referring to FIGS. 2-7, a manual cup sealer in accordance with the present invention is shown comprising:

a frame unit 7, which comprises a horizontal bottom plate 74, and two upright side panels 71 perpendicularly upwardly extended from the top wall of the horizontal bottom plate 74 at two opposite lateral sides, each upright side panel 71 having a horizontal sliding slot 711 disposed near the bottom side thereof, a pivot hole 712 disposed near the rear upper side thereof, a locating portion, for example, locating hole 713 disposed near an upper front side thereof and an elongated guide slot 714 vertically disposed at a lower front side thereof;

a transmission shaft 1 rotatably inserted through the pivot hole 712 on each of the two upright side panels 71 of the frame unit 7, having a pivot member 11 and a stop rod 12 respectively obliquely extended from the periphery thereof at front and rear sides (see FIG. 3);

a connection plate 10 having a first end 101 thereof pivotally connected to the pivot member 11 at the transmission shaft 1 and a second end 102 thereof for connection to an upper rear part of a first link 2;

a handlebar 13 perpendicularly connected to one end of the transmission shaft 1 outside the frame unit 7;

a first link 2 having a coupling hole 21 (see FIG. 3) located on one end thereof and pivotally coupled to the transmission shaft 1 and a locating portion, for example, locating hole 22 located on the other end thereof (see FIG. 4);

a first spring member 23 having one end 231 thereof fastened to the locating hole 22 of the first link 2 and the opposite end 232 thereof fastened to a bottom side of a carrier board 6 (see FIG. 2 and FIG. 5);

a second link 3 having a coupling hole 31 (see FIG. 3) located on a rear end thereof and pivotally coupled to the transmission shaft 1, a stop edge 32 located on the rear end adjacent to the stop rod 12 at the transmission shaft 1 and a pivot hole 33 located on a front end thereof;

a pivot member 34 inserted through the pivot hole 33 of the second link 3 and connected between the two upright side panels 71 of the frame unit 7;

a die link 4, which comprises a bracket 41 that has two upright sidewalls 411 respectively disposed adjacent to the elongated guide slot 714 at each of the two upright side panels 71 of the frame unit 7, an axle 42 inserted through the elongated guide slot 714 at each of the two upright side panels 71 of the frame unit 7 and affixed to the two upright sidewalls 411 of the bracket 41, two second spring members 43 each having a bottom end 431 respectively fastened to the two distal ends of the axle 42 and a top end 432 respectively fastened to the upright side panels 71 of the frame unit 7, and a plurality of drag members 44 each having a bottom coupling hole 441 pivotally coupled to the axle 42 and a top coupling portion 442 pivotally coupled to the pivot hole 33 of the second link 3 by a pivot 34;

an upper electric heat sealing die 5 affixed with the top wall thereof to the bracket 41 of the die link 4 by fastening members 51, having a temperature sensor 50 carried on the top wall thereof (see FIG. 7) and connected with a power wire 501 for heating temperature control (see FIG. 3) and a plurality of guide holes 52 located on the bottom wall thereof (see FIG. 8);

a sliding carrier board 6 having two side rails 60 respectively located on two opposite lateral sides thereof and respectively slidably coupled to the horizontal sliding slot 711 on each of the two opposite upright side panels 71 of the frame unit 7 and a bottom locating portion 62 connected to the opposite end 232 of the first spring member 23; and a lower electric heat sealing die 61 fixedly mounted on the front side of the sliding carrier board 6, having a center accommodation hole 612, an annular top flange 611 protruded from the top wall around the center accommodation hole 612 for stopping against the bottom wall of the upper electric heat sealing die 5, and a plurality of positioning pins 613 upwardly extended from the top wall and equiangularly spaced around the annular top flange 611 for insertion into the guide holes 52 of the upper electric heat sealing die 5.

During application of the present invention, the user can operate the handlebar 13 to bias the transmission shaft 1 counter-clockwise, the connection plate 10 is forced by the pivot member 11 of the transmission shaft 1 to move the first link 2, causing the two side rails 60 of the sliding carrier board 6 to be moved forwardly along the horizontal sliding slot 711 on each of the two opposite upright side panels 71 of the frame unit 7, and therefore the sliding carrier board 6 is extended out of the front side of the frame unit 7 (see FIG. 5). At this time, the user can put a plastic cup 8 in the center accommodation hole 612 of the lower electric heat sealing die 61, and then put fine-grained coffee 82 (see FIG. 9), fruit jelly (not shown) or the like in the plastic cup 8, and then attach a sealing film 81 to the top side of the plastic cup 8, and then operate the handlebar 13 to bias the transmission shaft 1 clockwise. At this time, the connection plate 10 is forced by the pivot member 11 of the transmission shaft 1 to move the first link 2, causing the two side rails 60 of the sliding carrier board 6 to be pulled backwardly along the horizontal sliding slot 711 on each of the two opposite upright side panels 71 of the frame unit 7 by the first spring member 23, and therefore the sliding carrier board 6 is received in the frame unit 7 to keep the lower electric heat sealing die 61 in vertical alignment with the upper electric heat sealing die 5 (see FIG. 2). At this time, the user can keep forcing the handlebar 13 downwards in the clockwise direction to move the stop rod 12 of the transmission shaft 1 against the stop edge 32 of the second link 3, forcing the pivot member 34 to move the drag members 44 and axle 42 of the die link 4 in pulling the second spring members 43 downwards so that the bracket 41 will be lowered along the elongated guide slots 714 of the upright side panels 71 of the frame unit 7 to carry the upper electric heat sealing die 5 downwards (see FIG. 7), causing the upper electric heat sealing die 5 to seal the sealing film 81 to the top edge of the plastic cup 8 in the lower electric heat sealing die 61. When the user released the pressure hand from the handlebar 13 after sealing, the return force of the second spring members 43 immediately pulls the axle 42 upwards the elongated guide slots 714 of the upright side panels 71 of the frame unit 7, thereby carrying the upper electric heat sealing die 5 away from the lower electric heat sealing die 61 (see FIG. 5). When the user keeps turning the handlebar 13 upwards, the transmission shaft 1 is rotated counter-clockwise, and the connection plate 10 is forced by the pivot member 11 of the transmission shaft 1 to move the first link 2 in forcing the sliding carrier board 6 forwards, causing the two side rails 60 of the sliding carrier board 6 to be moved forwardly along the horizontal sliding slot 711 on each of the two opposite upright side panels 71 of the frame unit 7, and therefore the sliding carrier board 6 is extended out of the front side of the frame unit 7, allowing the user to take the sealed cup product 8' (see FIG. 9) out of the lower electric heat sealing die 61.

Further, the sliding carrier board 6 has two longitudinal guide slots 63 longitudinally extended to the rear side and respectively disposed adjacent to the side rails 60. When the sliding carrier board 6 is moved backwardly toward the inside of the frame unit 7, the front edge 631 of each of the two longitudinal guide slots 63 will be stopped against the front edge of each of the two opposite upright side panels 71 of the frame unit 7, limiting backward displacement of the sliding carrier board 6.

Further, each upright side panel 71 of the frame unit 7 has a stop bar 716 fixedly fastened to the outer wall thereof and transversely extending over the respective elongated guide slot 714 to avoid escape of the upright sidewalls 411 of the bracket 41 of the die link 4 out of the elongated guide slots 714 of the upright side panels 71 of the frame unit 7.

Further, a pivot pin 72 is provided at one or each of the upright side panels 71 of the frame unit 7 to support a bearing 73 (or roller) that is kept in contact with the top wall 64 of the sliding carrier board 6 to assure smooth sliding of the two side rails 60 of the sliding carrier board 6 along the horizontal sliding slot 711 on each of the two opposite upright side panels 71 of the frame unit 7.

Further, the sealing film 81 can be aluminum foil paper. Further, the aforesaid plastic cup 8 is prepared from a non-toxic, eco-friendly plastic material.

In conclusion, the invention provides a manual cup sealer that has the following features and advantages:

1. The user can put fine-grained coffee, fruit jelly or any other instant food in a plastic cup 8 and use the manual cup sealer to seal the plastic cup 8 with a sealing film 81 by oneself.

2. The user can seal the desired amount of fine-grained coffee, fruit jelly or any other instant food subject to actual requirement, keeping sealed cup coffee, cup fruit jelly or other cup instant food in good taste for service within a certain time period.

3. When comparing to the expense of purchasing commercial cups of coffee from department store or shopping mart, the invention saves the cost.

4. The manual cup sealer has a small size, practical for use in office or at home.

5. The manual cup sealer is easy to operate. By means of rotating the transmission shaft 1 counter-clockwise to move the first link 2, the sliding carrier board 6 is moved forwardly out of the frame unit 7 (see FIG. 5) for allowing a plastic cup 8 with a sealing film 81 to be put together in the lower electric heat sealing die 61. When rotating the transmission shaft 1 clockwise, the first link 2 will be forced to pull the sliding carrier board 6 backwardly toward the inside of the frame unit 7 (see FIG. 2).

Figure 9:
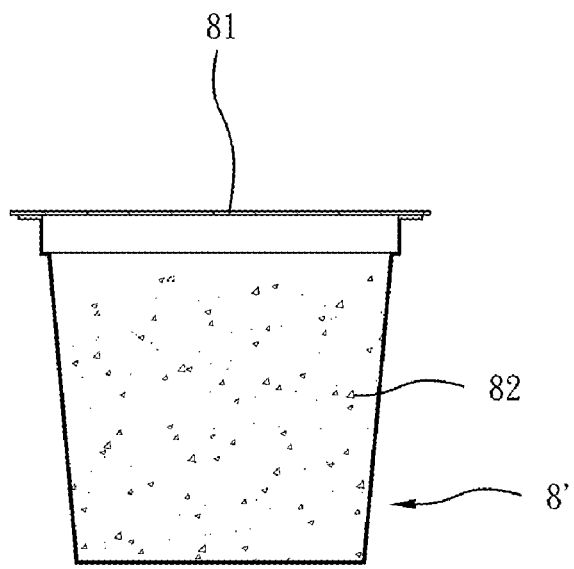
FIG. 9 is a sectional view of a sealed cup product according to the present invention.

When rotating the transmission shaft 1 further in the clockwise direction, the second link 3 will be forced to move the drag members 44 and axle 42 of the die link 4 in carrying the upper electric heat sealing die 5 downwards to seal the sealing film 81 to the top edge of the plastic cup 8 in the lower electric heat sealing die 61 (see FIG. 5), thereby obtaining a sealed cup product 8' (see FIG. 9).

While only one embodiment of the present invention has been shown and described, it will be understood that various modifications and changes could be made thereunto without departing from the spirit and scope of the invention disclosed.

What is claimed is:

1. A manual cup sealer comprising:

a frame unit, said frame unit comprising a horizontal bottom plate and two upright side panels perpendicularly upwardly extended from a top wall of said horizontal bottom plate at two opposite lateral sides, each said upright side panel having a horizontal sliding slot disposed near a bottom side thereof, a pivot hole disposed near a rear upper side thereof, a locating hole disposed near an upper front side thereof and an elongated guide slot vertically disposed at a lower front side thereof;

a transmission shaft rotatably inserted through the pivot holes of the two upright side panels of said frame unit, said transmission shaft having a pivot member and a stop rod respectively obliquely extended from the periphery thereof at front and rear sides;

a connection plate, said connection plate having a first end thereof pivotally connected to the pivot member at said transmission shaft and a second end thereof for connection to an upper rear part of a first link;

a first link, said first link having a coupling hole located on one end thereof and pivotally coupled to said transmission shaft and a locating hole located on an opposite end thereof;

a first spring member, said first spring member having one end thereof fastened to the locating hole of said first link and an opposite end thereof for fastening to a bottom side of a carrier board;

a second link, said second link having a coupling hole located on a rear end thereof and pivotally coupled to said transmission shaft, a stop edge located on the rear end adjacent to the stop rod of said transmission shaft and a pivot hole located on a front end thereof;

a pivot member inserted through the pivot hole of said second link and connected between the two upright side panels of said frame unit;

a die link, said die link comprising a bracket, said bracket comprising two upright sidewalls respectively disposed adjacent to the elongated guide slot at each of said two upright side panels of said frame unit, an axle inserted through the elongated guide slot at each of said two upright side panels of said frame unit and affixed to the two upright sidewalls of said bracket, two second spring members each having a bottom end respectively fastened to two distal ends of said axle and a top end respectively fastened to said upright side panels of said frame unit, and a plurality of drag members, each said drag member having a bottom coupling hole pivotally coupled to said axle and a top coupling portion pivotally coupled to the pivot hole of said second link by a pivot;

an upper electric heat sealing die, said upper electric heat sealing die comprising a top wall affixed to said bracket of said die link, a temperature sensor mounted on the top wall thereof and connected with a power wire for heating temperature control and a plurality of guide holes located on a bottom wall thereof;

a sliding carrier board, said sliding carrier board comprising two side rails respectively located on two opposite lateral sides thereof and respectively slidably coupled to the horizontal sliding slots of said opposite upright side panels of said frame unit and a bottom locating portion connected to the opposite end of said first spring member; and a lower electric heat sealing die fixedly mounted on a front side of said sliding carrier board, said lower electric heat sealing die comprising a center accommodation hole and an annular top flange protruded from a top wall thereof around said center accommodation hole for stopping against a bottom wall of said upper electric heat sealing die.

2. The manual cup sealer as claimed in claim 1, further comprising a handlebar perpendicularly connected to one end of said transmission shaft outside said frame unit.

3. The manual cup sealer as claimed in claim 1, wherein said sliding carrier board comprises two longitudinal guide slots longitudinally extended to a rear side thereof and respectively disposed adjacent to said side rails, each said longitudinal guide slot having a front edge for stopping against a front edge of each of said two opposite upright side panels of said frame unit to limit backward displacement of said sliding carrier board.

4. The manual cup sealer as claimed in claim 1, wherein said frame unit further comprises two stop bars respectively affixed to said upright side panels at an outer side and transversely extending over the respective elongated guide slot to avoid escape of said upright sidewalls of said bracket of said die link out of the elongated guide slots of said upright side panels of said frame unit.

5. The manual cup sealer as claimed in claim 1, wherein said frame unit further comprises two pivot pins respectively mounted on the upright side panels thereof and two bearings respectively rotatably mounted on said pivot pin and kept in contact with the top wall of said sliding carrier board.

6. The manual cup sealer as claimed in claim 1, wherein said frame unit further comprises two pivot pins respectively mounted on the upright side panels thereof and two rollers respectively rotatably mounted on said pivot pin and kept in contact with the top wall of said sliding carrier board.

7. The manual cup sealer as claimed in claim 1, wherein said frame unit further comprises a pivot pin provided at one upright side panel thereof and a bearing rotatably mounted on said pivot pin and kept in contact with the top wall of said sliding carrier board.

8. The manual cup sealer as claimed in claim 1, wherein said frame unit further comprises a pivot pin provided at one upright side panel thereof and a roller rotatably mounted on said pivot pin and kept in contact with the top wall of said sliding carrier board.

9. The manual cup sealer as claimed in claim 1, wherein said upper electric heat sealing die comprises a plurality of guide holes located on a bottom wall thereof; said lower electric heat sealing die comprises plurality of positioning pins upwardly extended from the top wall thereof and equiangularly spaced around said annular top flange for insertion into the guide holes of said upper electric heat sealing die.

* * * * *